US011240472B2

(12) United States Patent
Brady et al.

(10) Patent No.: US 11,240,472 B2
(45) Date of Patent: Feb. 1, 2022

(54) METHODS AND APPARATUS TO PERFORM REMOTE MONITORING

(71) Applicant: Intel Corporation, Santa Clara, CA (US)

(72) Inventors: John Brady, Celbridge (IE); Keith Nolan, Mullingar (IE); Wael Guibene, Leixlip (IE); Michael Nolan, Maynooth (IE); Mark Kelly, Leixlip (IE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/870,604

(22) Filed: May 8, 2020

(65) Prior Publication Data

US 2021/0099678 A1 Apr. 1, 2021

Related U.S. Application Data

(63) Continuation of application No. 15/197,239, filed on Jun. 29, 2016, now Pat. No. 10,666,909.

(51) Int. Cl.
*H04N 7/18* (2006.01)
*G06T 7/174* (2017.01)
(Continued)

(52) U.S. Cl.
CPC ............... *H04N 7/183* (2013.01); *G06T 7/13* (2017.01); *G06T 7/174* (2017.01);
(Continued)

(58) Field of Classification Search
CPC ............... H04N 7/183; H04N 5/23206; H04N 5/23212; H04N 5/232; H04N 1/00209;
(Continued)

(56) References Cited

U.S. PATENT DOCUMENTS 10,666,909 B2   5/2020  Brady et al.
2004/0016870 A1 1/2004  Pawlicki et al.
(Continued)

OTHER PUBLICATIONS

Crossbow, "Imote 2 High-Performance Wireless Sensor Netowrk Node," Document Part No. 6020-0117-02 Rev A, <www.xbow.com>, retrieved on Sep. 29, 2016, 3 pages.
(Continued)

*Primary Examiner* — Nasim N Nirjhar
(74) *Attorney, Agent, or Firm* — Hanley, Flight & Zimmerman, LLC

(57) ABSTRACT

Methods, apparatus, systems and articles of manufacture to perform remote monitoring are disclosed. Some example methods include adjusting an image capture rate at which an image sensor captures images based on a difference image containing differences between a first image of a first set of objects and a second image of a second set of objects. Example methods also include reducing a file size of the difference image using an edge detection technique and prioritizing one or more of a set of frames based on an amount of information contained in the frames. The frames are subdivisions of the image. In further example methods, the first image is taken at a first time and the second image is taken at a second, later time, and the method includes subtracting the first image from the second image to generate the difference image.

18 Claims, 11 Drawing Sheets

FIRST IMAGE — 302     304 — SECOND IMAGE

306 — DIFFERENCE IMAGE

(51) Int. Cl.
*G06T 7/13* (2017.01)
*H04N 5/232* (2006.01)
*H04N 1/00* (2006.01)

(52) U.S. Cl.
CPC ..... *H04N 1/00209* (2013.01); *H04N 5/23206* (2013.01); *H04N 5/23212* (2013.01); *G06T 2207/20224* (2013.01); *G06T 2207/30232* (2013.01)

(58) Field of Classification Search
CPC .............. G06T 7/174; G06T 7/13; G06T 2207/20224; G06T 2207/30232
See application file for complete search history.

(56) References Cited

U.S. PATENT DOCUMENTS

| | | |
|---|---|---|
| 2005/0280707 A1 | 12/2005 | Sablak et al. |
| 2008/0106636 A1 | 5/2008 | Wernersson |
| 2008/0165861 A1 | 7/2008 | Wen et al. |
| 2010/0124274 A1 | 5/2010 | Cheok et al. |
| 2015/0110168 A1* | 4/2015 | Chi |
| 2015/0130935 A1 | 5/2015 | Siann et al. |
| 2015/0248755 A1 | 9/2015 | Vagman et al. |
| 2016/0044558 A1 | 2/2016 | Fukada et al. |
| 2016/0132052 A1 | 5/2016 | Seydoux et al. |
| 2016/0301238 A1* | 10/2016 | Khoshvenis |
| 2016/0379074 A1 | 12/2016 | Nielsen et al. |
| 2017/0142137 A1* | 5/2017 | Xia |
| 2019/0035091 A1 | 1/2019 | Bi et al. |

OTHER PUBLICATIONS

Hengstler et al., "MeshEye: A Hybrid-Resolution Smart Camera Mote for Application in Distributed Intelligent Surveillance," Proceedings of the 6th International Conference on Information Processing in Sensor Networks, Apr. 2007, 10 pages.

United States Patent and Trademark Office, "Notice of Allowance," mailed in connection with U.S. Appl. No. 15/197,239, dated Jan. 15, 2020, 8 pages.

United States Patent and Trademark Office, "Non-final Office Action," mailed in connection with U.S. Appl. No. 15/197,239, dated Aug. 6, 2019, 39 pages.

International Bureau, "International Preliminary Report on Patentability," mailed in connection with International Patent Application No. PCT/US2017/034266, dated Jan. 1, 2019, 9 pages.

International Searching Authority, "International Search Report & Written Opinion," mailed in connection with International Patent Application No. PCT/US2017/034266, dated Aug. 24, 2017, 14 pages.

\* cited by examiner

EVERY SECOND PIXEL IS PUNCTURED

EVERY SECOND NON-WHITE PIXEL IS PUNCTURED

METHODS AND APPARATUS TO PERFORM REMOTE MONITORING

RELATED APPLICATION(S)

This patent arises from a continuation of U.S. patent application Ser. No. 15/197,239 (now U.S. Pat. No. 10,666,909), which is titled "METHODS AND APPARATUS TO PERFORM REMOTE MONITORING," and which was filed on Jun. 29, 2016. Priority to U.S. patent application Ser. No. 15/197,239 is claimed. U.S. patent application Ser. No. 15/197,239 is hereby incorporated herein by reference in its entirety.

FIELD OF THE DISCLOSURE

This disclosure relates generally to remote monitoring objects of interest, and, more particularly, to performing remote monitoring in constrained networks.

BACKGROUND

The proliferation of wireless communication technologies has enhanced the ability to communicate information from remote locations that are off-the-grid (in terms of wired communication networks) to central facilities/base stations at which the information can be analyzed. The expansion of such wireless communication technologies is, in turn, spurring the development of monitoring technologies designed to monitor geographically remote objects of interest. Such monitoring technologies leverage available wireless communication technologies to transmit monitoring data to a central facility for processing.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
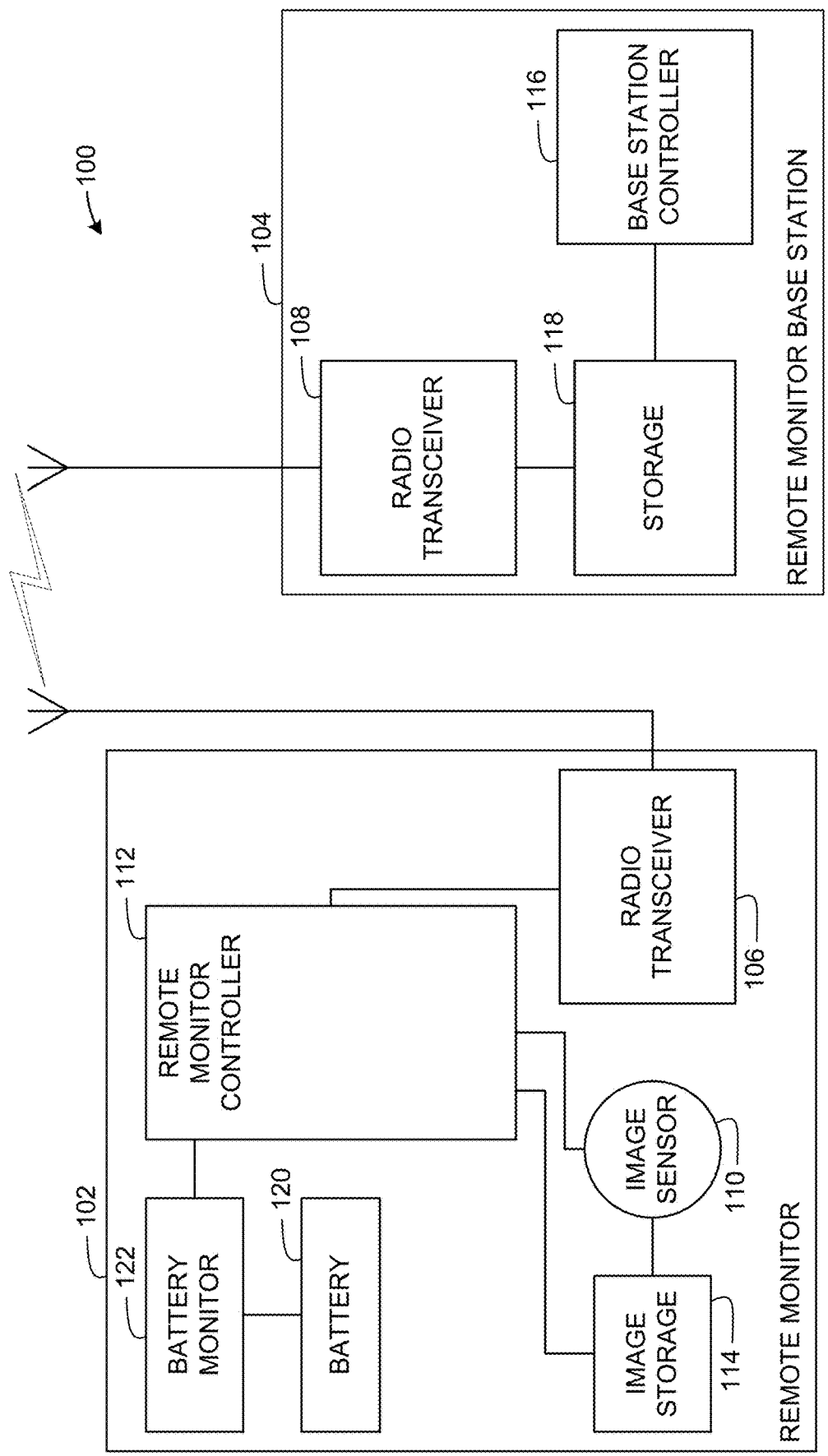
FIG. 1 is a block diagram of an example remote monitoring system having an example remote monitor in communication with an example base station.

The proliferation of wireless communication technologies has enhanced the ability to communicate information from remote locations that are off-the-grid (in terms of wired communications) to central facilities/base stations at which the information can be analyzed. The expansion of such wireless communication technologies is, in turn, spurring the development of monitoring technologies designed to monitor geographically remote objects of interest. Such monitoring technologies leverage available wireless communication technologies to transmit monitoring data to a central facility for processing. In some applications, various circumstances, including the geographical locations of objects to be monitored and/or the environment in which such objects are located present challenges. For example, the amount of data being collected by remote monitoring system(s) are often quite large and the geographical locations of the monitors typically requires transmission of data over long distances. Unfortunately, in some cases, traditional wireless networks (e.g., 4G, WiFi, microwave, etc.) are not available in such locations, do not provide sufficient coverage in such locations, and/or are not energy/cost effective. Although, less sophisticated wireless communication networks/equipment are available, such communication technologies are typically bandwidth constrained and are unable to reliably transmit large quantities of data. Even in cases where system bandwidth is sufficient to transmit the remote monitoring data, limited access to power sources in remote regions further reduce the viability of currently available remote monitoring solutions.

Methods, system, apparatus, and articles of manufacture disclosed herein perform low power remote monitoring using bandwidth-constrained wireless communication technologies. The disclosed methods perform image capture at a rate that is adjustable based on an amount of activity occurring within a field of interest. Adjusting the rate of image capture in this manner reduces the amount of data that is captured, processed and ultimately transmitted to the remote base station when the amount of activity occurring in the field of interest is less than a threshold amount and increases the amount of data that is captured, processed and ultimately transmitted to the remote base station when the amount of activity occurring in the field of interest is greater than a threshold amount. Thus, the systems and methods disclosed herein conserve energy by providing a greater emphasis on information that identifies activity occurring in the field of interest and less emphasis on information that indicates a lack of activity occurring in the field.

The methods, apparatus, systems, and articles of manufacture disclosed herein are further configured to reduce the amount of monitoring information transmitted to the base station by removing extraneous detail from captured images. For example, in an application in which the presence of insects in an agricultural environment are being monitored, information illustrating the number of insects and the shape of the insects is retained, but detailed information about the monitored insects (e.g., the color of the insects, the texture of the insects, etc.) is removed.

To further reduce the amount of information transmitted to the base station an image is divided into multiple frames and frames having less than a threshold amount of relevant information are not transmitted. For example, some of the frames may include few or no insects, such that transmitting such frames is not helpful to understanding activity occurring in the area of interest. The amount of information to be transmitted is even further reduced using a pixel removal method by which pattern(s) of pixels are removed from the images/frames prior to transmission to the base station. In some examples, the pattern of pixels to be removed is selected in a manner that reduces impact on the ability of a technician to discern meaningful information in the image.

Bandwidth constrained long range (25 km) communication networks are often unreliable, thereby resulting in the loss of multiple, consecutive frames during transmission. The technologies disclosed herein attempt to reduce the impact of such frame loss by randomly ordering the frames prior to transmission. The randomly ordered frames can be transmitted with a seed value that is used at the base station to obtain the original ordering of the frames. Thus, if a set of consecutively transmitted frames are lost during transmission, the loss is less likely to negatively impact the information conveyed than if the frames had been transmitted in the original order.

The technologies disclosed herein further convey battery charge information to the base station which can be used to identify when a technician is to be sent to the remote monitor to change the battery. This eliminates the need to periodically send personnel to the remote monitors to determine whether a battery requires changing. The technologies disclosed herein can be used in a broad range of applications including military, security, industrial monitoring, wildlife exploration, agriculture, etc.

FIG. 1 is a block diagram of an example remote monitoring system 100 having an example remote monitor 102 in communication with an example base station 104. In some examples, the remote monitor 102 includes an example first wireless radio transceiver 106 configured to communicate wirelessly with an example second wireless radio transceiver 108 disposed in the base station 104. The first and second wireless transceivers 106, 108 can be implemented using any type of wireless transceiver capable of communicating in any type of wireless communication protocol. In some applications, the first and second wireless radio transceivers 106, 108 are implemented using any type of low-power wide area network transceiver that allows long range (e.g., 25 km) communications at a low bit rate. Such transceivers can operate at any of a set of frequently bands (e.g., 868 MHz, 915 MHz, 2.4 GHz, etc.).

In some examples, the remote monitor 102 additionally includes an example image sensor 110 that captures images of a field of interest. In some examples, the field of interest is an area being monitored for the presence (or absence) of objects, also referred to as "monitored objects." For illustration purposes only, the remote monitoring system 100 is described as being used in an agricultural application in which the monitored objects are insects that land on an insect trap (e.g., the field of interest).

The images of the field of interest are subsequently processed by an example remote monitor controller 112. In some examples, the remote monitor controller 112 is implemented using a microcontroller unit such as, for example, any of the microcontrollers in the Intel® Quark™ family of microcontroller units, any of the Intel® low-power processing platforms, etc. The remote monitor controller 112 and/or the image sensor 110 cause the captured images to be stored in an image storage 114.

An example base station controller 116 receives and processes the images received from the remote monitor 102 via the second radio transceiver 108. The processed images are stored in an example base station storage 118. In some examples, an example battery 120 powers the remote monitor 102 and an example battery monitor 122 determines an amount of charge remaining in the battery 120. The battery 120 is coupled via any suitable wiring (not shown) to the components residing in the remote monitor 102. At the base station 104 the received images are processed and action is taken, if needed. For example, if a significant number of insects appear in a received image, additional pesticide may be dispatched to crops located in the region in which the remote monitor 102 is positioned. Additionally, the type of pesticide dispatched can be selected based on the types of insects appearing in the received image. Thus, based on the remote monitoring system 100 pesticides can be applied to the crops on an as-needed basis, thereby reducing the total amount of pesticide that would otherwise be applied to the crops.

The example remote monitoring system 100 is illustrated in FIG. 1 as having a single remote monitor 102 and a single base station 104 for purposes of example only. In many example applications, the remote monitoring system 100 will include a plurality of the remote monitors 102 and a single base station 104 or a plurality of the remote monitors 102 and a plurality of the base stations 104.

Figure 2:
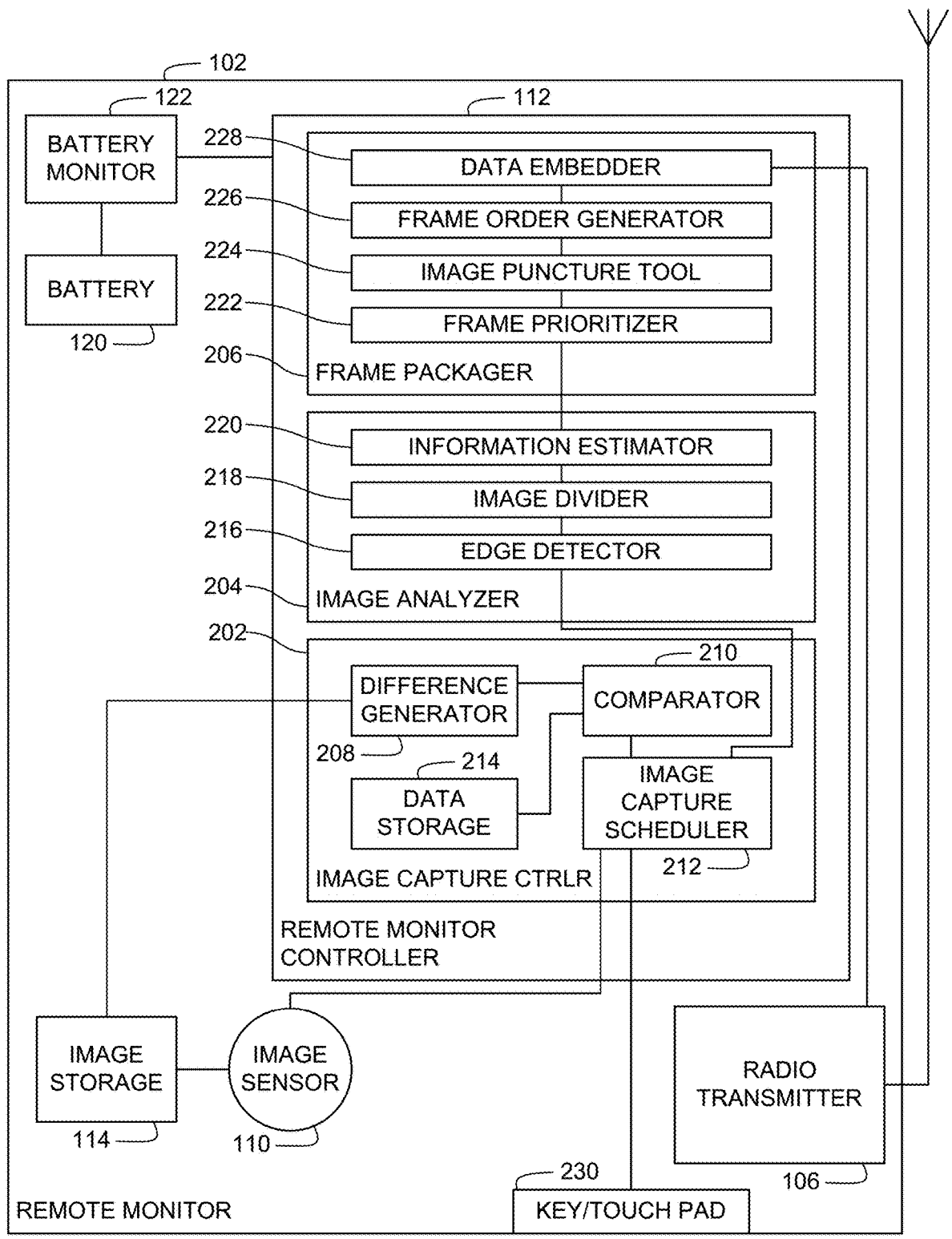
FIG. 2 is block diagram of the example remote monitor of FIG. 1 having an example image capture controller, an example image analyzer and an example image packager.

FIG. 2 is a block diagram of the example remote monitor 102 of FIG. 1. In some examples, the example remote monitor controller 112 of the remote monitor 102 includes an example image capture controller 202, an example image analyzer 204, and an example frame packager 206. In some examples, the image capture controller 202 is coupled to and controls the rate at which the example image sensor 110 captures images. In some examples, the image capture controller 202 includes an example image difference generator 208, an example comparator 210, an example image capture scheduler 212, and an example data storage device 214. In some examples, the image analyzer 204 includes an example edge detector 216, an example image divider 218, and an example information estimator 220. In some examples, the example frame packager 206 includes an example frame prioritizer 222, an example puncturing tool 224, an example frame order generator 226, and an example data embedder 228.

In some examples, the example image capture controller 202 identifies an example rate at which images will be captured by the example image sensor 110. In some such examples, the example image capture scheduler 212 is configured to capture images of the field of interest at an initial capture rate and controls the image sensor 110 in accordance with that initial capture rate. In some examples, the image capture scheduler 212 receives the initial capture rate via an input device 230 disposed, for example, on the exterior of the remote monitor 102. In some examples, the remote monitor 102 is pre-programmed with the initial capture rate. In some examples, the initial capture rate is transmitted from the example base station 104 (see FIG. 1) via the example base station transceiver 108 (see FIG. 1) and received at the example first wireless radio transceiver 106 for input to the image capture scheduler 212. The image capture scheduler 212 causes the image sensor 110 to capture images at the initial capture rate. The images of the field of interest collected by the image sensor 110 are supplied to the example image memory 114 for storage.

In some examples, the example image difference generator 208 monitors the image memory 114 to determine when new images are stored therein. In some examples, the image sensor 110 notifies the difference generator 208 when new images are stored in the image memory 114.

Figure 3:
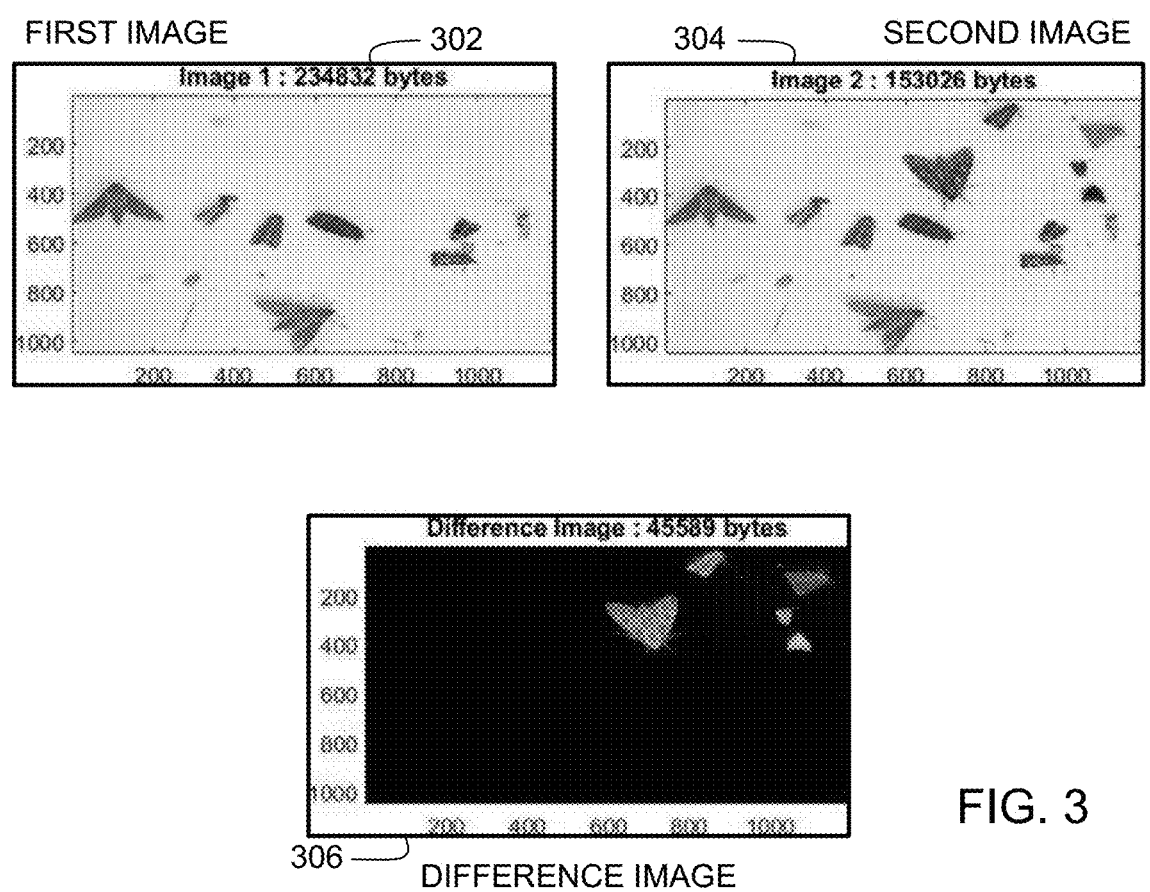
FIG. 3 is an illustration of an example first image, an example second image, and an example difference image created by the example image capture controller of FIG. 2.

Referring also to FIG. 3 which illustrates example images collected and generated by the remote monitor 102, when an example first image 302 and a subsequently collected example second image 304 have been stored in the image memory 114, the image difference generator 208 performs an image subtraction operation to create a difference image 306 that illustrates the differences between the first and second images 302, 304. As a result, the difference image 306 represents visual changes (in the object being monitored) between a first time at which the first image 302 was collected and a second time at which the second image 304 was collected. For example, if, the field of interest includes six monitored objects at the first time, the first image 302 will include the six monitored objects. Similarly, if the field of interest includes 10 monitored objects at the second time, the second image 304 will include the ten monitored objects. In such an example, the difference image 306 containing the differences between the first image 302 and the second image 304 will include the four monitored objects that appear in the second image 306 but not the first image 302. The image difference generator 208 supplies the difference image 306 to the comparator 210 which determines an amount of data contained in the difference image 306 (e.g., the size, in bytes, of an electronic image file containing the difference image 306). In addition, the comparator 210 obtains one or more threshold image data values from the data storage 214 and compares the amount of data contained in the difference image 306 to the threshold image data values. The comparator 210 supplies the results of the comparison to the image capture scheduler 212. The image capture scheduler 210 responds to the results from the comparator 210 by adjusting, if needed, the rate at which the image sensor 110 collects images. Thus, the remote monitor 102, by comparing the amount of data contained in the difference image 306 to the threshold image data values, is able to determine when the field of interest has experienced a change sufficient to warrant adjusting the rate at which the image sensor 110 collects images.

In some examples, when the activity (e.g., the number of monitored objects) in the field of interest increases, the remote monitor 102 increases the image capture rate, and when the activity in the field of interest decreases, the remote monitor 102 decreases the image capture rate. In some such examples, when the amount of data contained in the difference image equals or exceeds a first threshold image data value, the image capture scheduler 212 increases the rate at which images of the monitored object are collected. Increasing the image capture rate ensures that the activity causing the difference image to exceed the first threshold image data value is captured in sufficient detail. Conversely, when the amount of data contained in the difference image 306 is less or equal to a second threshold image data value, the image capture scheduler 212 decreases the image capture rate. In some examples, when the amount of data contained in the difference image 306 is less than or equal to the first threshold image data value and greater than or equal to the second threshold image data value, the image capture scheduler 212 causes the image sensor 110 to maintain the same image capture rate (i.e., the image capture rate is not adjusted). In some examples, the image data comparator 210 compares the amount of data contained in the difference image 306 to a single threshold image data value and adjusts (either up or down) the image capture rate based on the results of the comparison. In this manner, the remote monitor 102 conserves power by decreasing the number of images collected (and subsequently processed, as described below) when there is less activity occurring in the field of interest.

In some examples, the example image analyzer 204 is configured to analyze/process the difference images stored in the example image memory 114. The image analyzer 204 can be configured to identify the presence of the difference image 306 stored in the image memory 114 in any number of ways. For example, the example image capture controller 202 can be configured to notify the example image analyzer 204 when the new difference image 306 has been stored in the image memory 114. In some examples, any of the example image difference generator 208, the example image comparator 210, and/or the example image capture scheduler 212 cause the difference image 306 to be supplied directly to the image analyzer 204 for analysis/processing. In some examples, the image analyzer 204 is configured to monitor the storage activity occurring in the image memory 114 and is configured to extract newly stored difference image 306 from the image memory 114 for processing.

Figure 4:
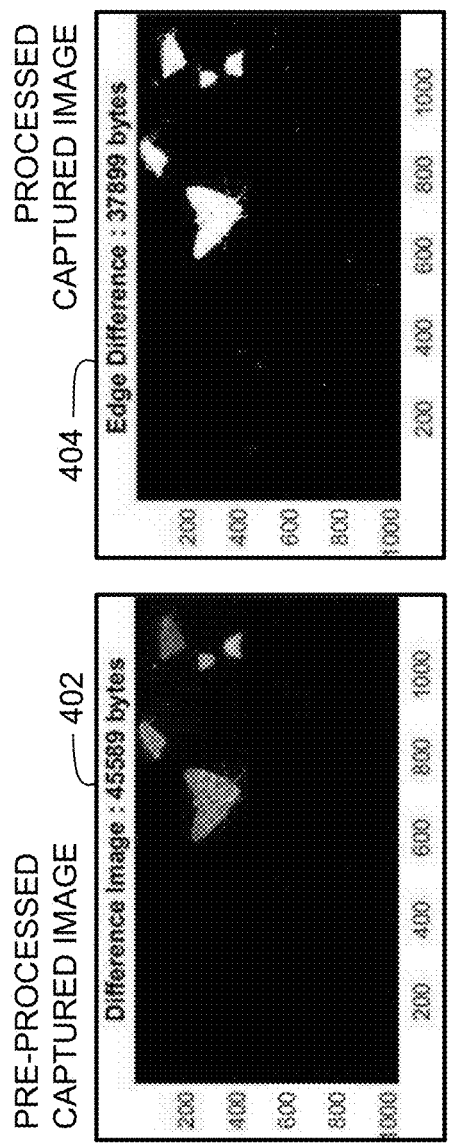
FIG. 4 is an illustration of an example captured image and an example modified version of the captured image.

In some examples, the example image detector 216 of the example image analyzer 204 uses any known edge detection technique to modify the difference image 306 extracted from the example image memory 114 thereby creating a modified difference image. In the modified difference image, the pixels contained inside an outline of a monitored object (e.g., an insect) are black and the pixels lying outside an outline of a monitored object (e.g., an insect) are white. Example edge detection techniques include Canny edge detection, edge thinning techniques, differential edge detection, phase congruency based edge detection, subpixel edge detection, etc. As a result, the modified difference image contain outlines of the monitored insects but lacks further detail (e.g., texture, color variations, etc.) about the monitored insects. Thus, in some examples the modified difference image is monochromatic and has a smaller file size than the unmodified difference image. FIG. 4 includes a captured image 402 and a modified image 404 on which edge detection has been performed thereby illustrating example details that can be removed from an image as a result of using edge detection.

Figure 5:
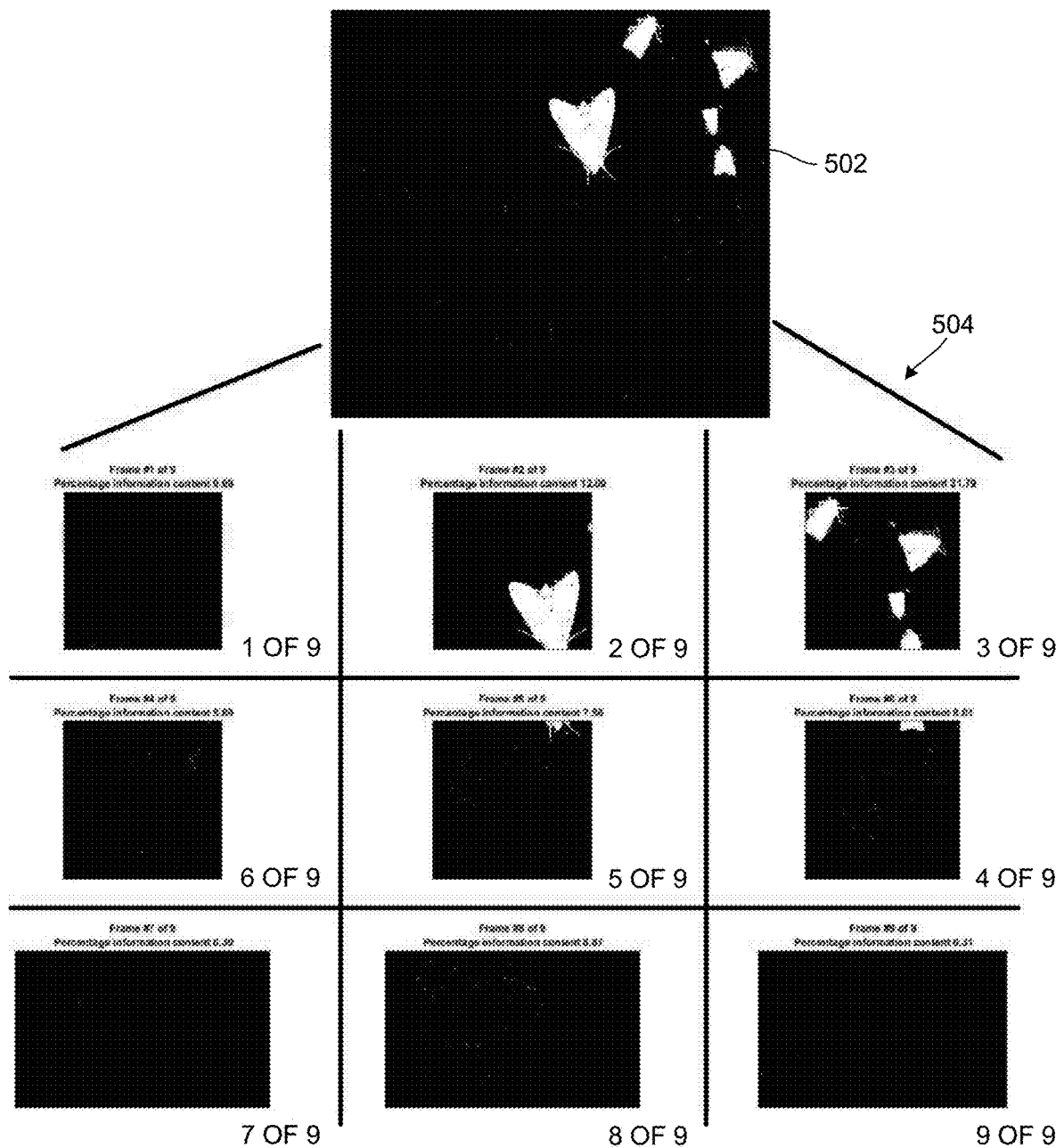
FIG. 5 is an illustration of an example set of frames into which the example modified difference image has been divided.

The modified difference image 502 (see FIG. 5) is supplied by the example edge detector 216 to the example image divider 218 which sub-divides the modified image 404 into a configurable number of frames 504 as illustrated in FIG. 5. The image frames 504 are supplied by the image divider 218 to the example information estimator 220. The information estimator 220 estimates the amount of information contained in each of the frames 504. In some examples, the information estimator 220 estimates the amount of information contained in each frame 504 by counting the number of pixels in each frame 504, the number of black pixels in each frame 504 and/or the total number of white pixels in each frame 504 and then calculates the percentage of black pixels relative to both black and white pixels included in each frame 504.

In some examples, the example information estimator 220 supplies the percentage of black pixels calculated for each of the example frames 504 associated with the example modified difference image 404 (see FIG. 4) to the example frame prioritizer 222. The frame prioritizer 222 uses the percentage of black pixels of the frames 504 to identify a priority for each such frame 504. In some examples, the frame prioritizer 222 identifies a configurable number of the frames 504 having the highest percentage of black pixels (as compared to the other frames) as being higher priority than the other frames of the set of frames 504. In some examples, the frame prioritizer 222 may identify any number of the frames 504 having the highest percentage of black pixels as being higher priority than the remaining frames 504 in the set of the frames 504. The frame prioritizer 222 supplies the frames 504 and associated priority information to the example puncturing tool 224. In some examples, only the frames 504 deemed to be high priority frames are supplied to the puncturing tool 224 for subsequent processing and transmission to the example base station 104.

Figure 6:
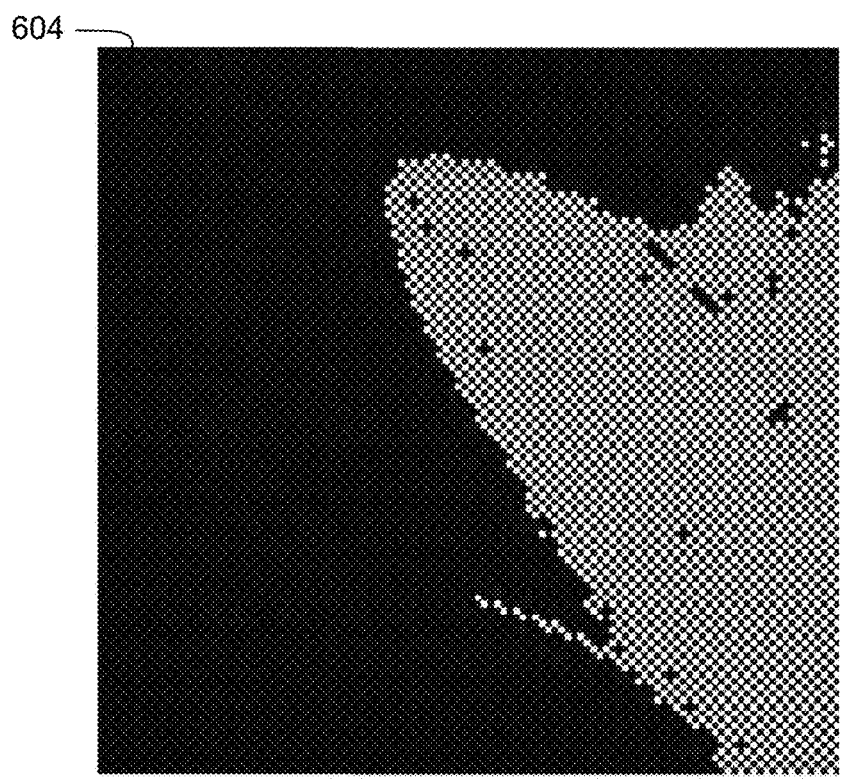
FIG. 6 is an illustration of an example first punctured frame and an example second punctured frame.
Figure 6:

The example puncturing tool 224 reduces the amount of image content that will subsequently be transmitted by the example remote monitor 102 to the example base station 104 by creating a punctured version of the example frames 504 to be transmitted to the example base station 104. A punctured version of each such frame 504 includes a fewer number of pixels than a pre-punctured version of the same frame. The pixels to be omitted from the punctured version can be selected in a manner that minimizes impact on the meaning conveyed by the content of the punctured image. As illustrated in FIG. 6, in some examples, every $2^{nd}$ pixel in the pre-punctured version of a frame is omitted from a punctured version 602 of the same frame thereby creating a checkered effect. As further illustrated in FIG. 6, in some examples, every $2^{nd}$ non-white pixel in the pre-punctured frame is omitted from the punctured frame 604. Due to the omission of pixels, the punctured frames 602. 604 have significantly less data than the pre-punctured frames and, thus, are significantly smaller in size.

The example punctured frames 602. 604 are supplied by the example puncturing tool 224 to the example frame order generator 226. The frame order generator 226 determines a random order in which the punctured frames 602, 604 are to be transmitted by the example remote monitor 102 to the example base station 104. Transmitting the punctured frames 602, 604 in a random (e.g., non-sequential order) order helps to lessen the effects of information loss that would occur if the frames were instead transmitted in consecutive order and a number of the consecutive frames were lost during transmission on a volatile, lossy link. In some examples, the frame order generator 226 uses a seed value to generate the random order of the punctured frames. In some such examples, the frame order generator generates a random order using a random number generator technique performs mathematical manipulations on the seed value to determine a first of the random numbers, and then performs mathematical manipulations on the first of the random numbers to generate a second of the random numbers, etc. In some examples, the random number generator technique is configured to operate on a number represented using a specified number of bits. In some such examples, the seed value can be any number represented using the specified number of bits. The seed value can be any number. The example data embedder 228 creates a header for the set of punctured frames 602, 604 to be transmitted. In some examples, the data embedder 226 includes the seed value as well as the total number of punctured frames to be transmitted in a frame header payload. In some examples, the data embedder 228 uses a JPEG file interchange format (JFIF) (or any other desired format) to arrange the frames for transmission to the example base station 104. In some examples, the example battery monitor 122 supplies the state of charge of the example battery 120 installed in the remote monitor 102 and appends information identifying the battery charge information to the JFIF frame header payload.

While an example manner of implementing the remote monitoring system 100 is illustrated in FIG. 1 and the remote monitor 102 of FIG. 1 is illustrated in FIG. 2, one or more of the elements, processes and/or devices illustrated in FIG. 1 and FIG. 2 may be combined, divided, re-arranged, omitted, eliminated and/or implemented in any other way. Further, the example remote monitor 102, the example remote monitoring base station 104, the example first wireless radio transceiver 106, the example second wireless radio transceiver 108, the example image sensor 110, the example remote monitor 112, the example image storage 114, the example base station controller 116, the example base station storage 118, the example image capture controller 202, the example image analyzer 204, the example frame packager 206, the example image difference generator 208, the example comparator 210, the example image capture scheduler 212, the example data storage 214, the example edge detector 216, the example image divider 218, the example information estimator 220, the example frame prioritizer 222, the example puncturing tool 224, the example frame order generator 226, the example data embedder 228, and/or, more generally, the example remote monitoring system 100 of FIG. 1 may be implemented by hardware, software, firmware and/or any combination of hardware, software and/or firmware. Thus, for example, any of the example remote monitor 102, the example remote monitoring base station 104, the example first wireless radio transceiver 106, the example second wireless radio transceiver 108, the example image sensor 110, the example remote monitor 112, the example image storage 114, the example base station controller 116, the example base station storage 118, the example image capture controller 202, the example image analyzer 204, the example frame packager 206, the example image difference generator 208, the example comparator 210, the example image capture scheduler 212, the example data storage 214, the example edge detector 216, the example image divider 218, the example information estimator 220, the example frame prioritizer 222, the example puncturing tool 224, the example frame order generator 226, the example data embedder 228, and/or, more generally, the example remote monitoring system 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)).

When reading any of the apparatus or system claims of this patent to cover a purely software and/or firmware implementation, at least one of the example, example remote monitor 102, the example remote monitoring base station 104, the example first wireless radio transceiver 106, the example second wireless radio transceiver 108, the example image sensor 110, the example remote monitor 112, the example image storage 114, the example base station controller 116, the example base station storage 118, the example image capture controller 202, the example image analyzer 204, the example frame packager 206, the example image difference generator 208, the example comparator 210, the example image capture scheduler 212, the example data storage 214, the example edge detector 216, the example image divider 218, the example information estimator 220, the example frame prioritizer 222, the example puncturing tool 224, the example frame order generator 226, the example data embedder 228, is/are hereby expressly defined to include a tangible computer readable storage device or storage disk such as a memory, a digital versatile disk (DVD), a compact disk (CD), a Blu-ray disk, etc. storing the software and/or firmware. Further still, the example remote monitoring system 100 of FIG. 1 may include one or more elements, processes and/or devices in addition to, or instead of, those illustrated in FIG. 2, and/or may include more than one of any or all of the illustrated elements, processes and devices.

Figure 7:
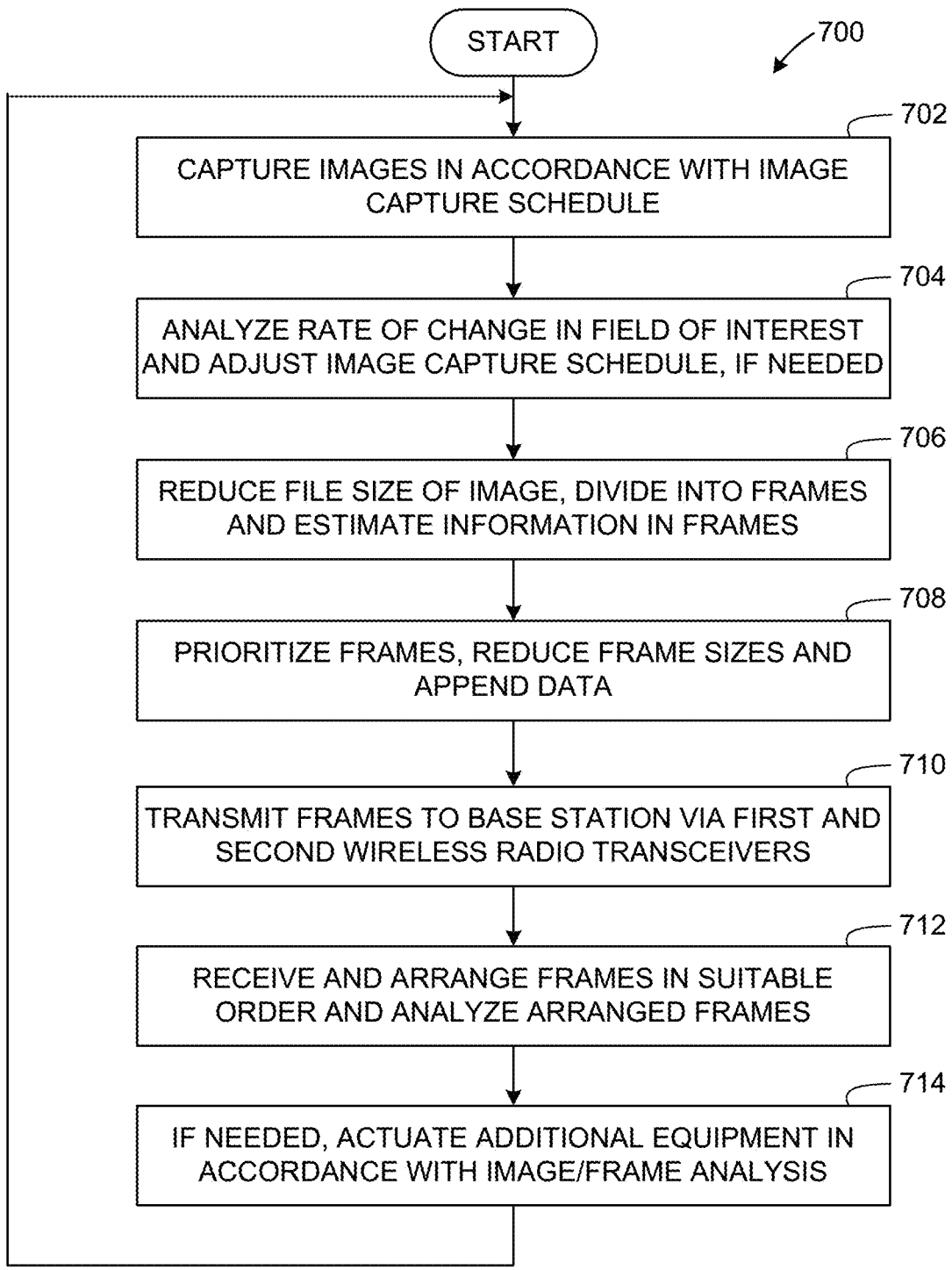
FIG. 7 is a flowchart representative of example machine readable instructions which may be executed to implement the example remote monitor 102 of FIG. 1 and FIG. 2.
Figure 8:
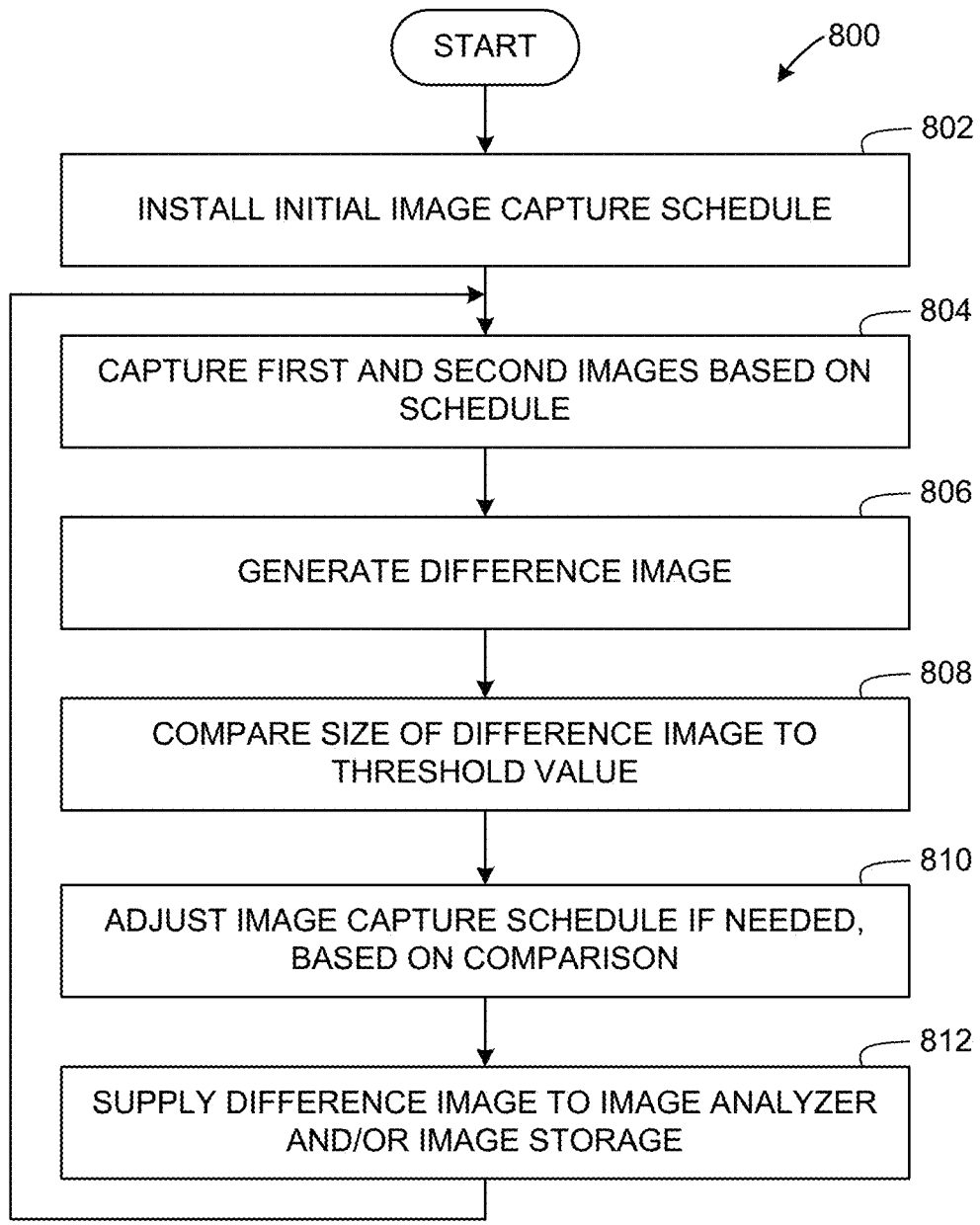
FIG. 8 is a flowchart representative of example machine readable instructions which may be executed to implement the example image capture controller of FIG. 2.
Figure 9:
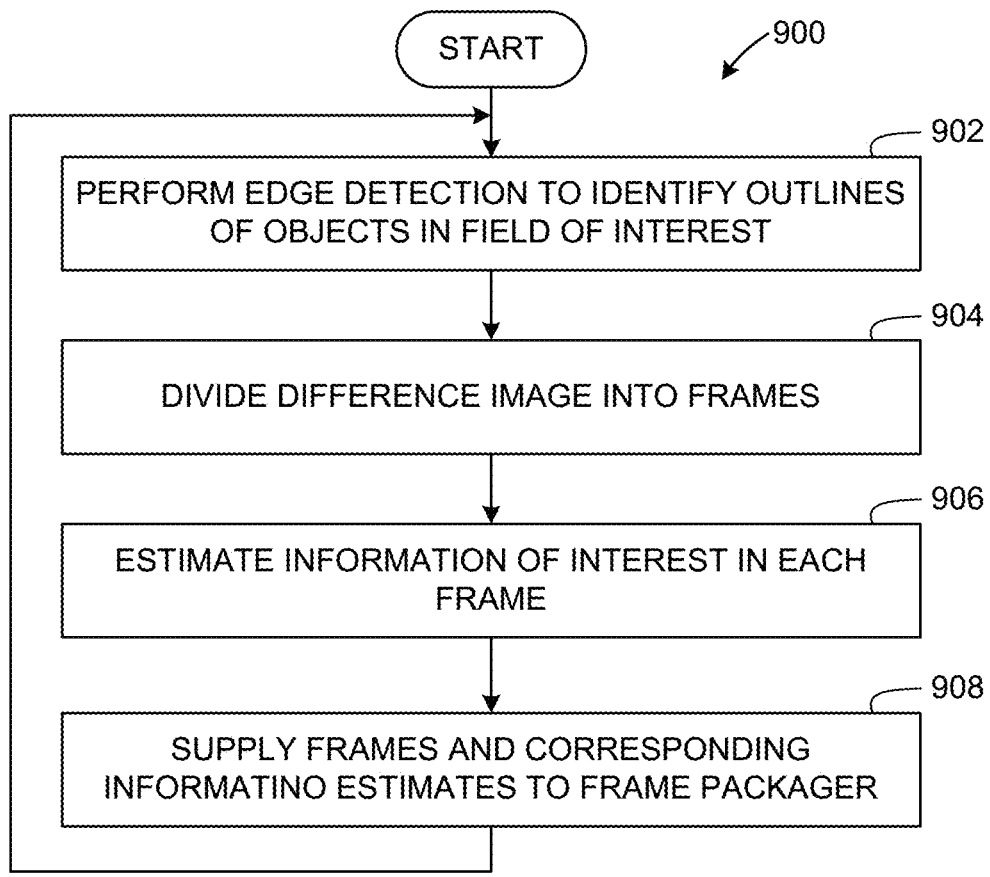
FIG. 9 is a flowchart representative of example machine readable instructions which may be executed to implement the example image analyzer of FIG. 2.

Flowcharts representative of example machine readable instructions for implementing the remote monitoring system 100 of FIG. 1 are shown in FIGS. 7, 8 and 9. In these examples, the machine readable instructions comprise a program(s) for execution by a processor such as the processor 1112 shown in the example processor platform 1100 discussed below in connection with FIG. 11. The program(s) may be embodied in software stored on a tangible computer readable storage medium such as a CD-ROM, a floppy disk, a hard drive, a digital versatile disk (DVD), a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowcharts illustrated in FIGS. 7, 8, and 9, many other methods of implementing the example remote monitoring system 110 and the remote monitor 102 may alternatively be used. For example, the order of execution of the blocks may be changed, and/or some of the blocks described may be changed, eliminated, or combined.

As mentioned above, the example processes of FIGS. 7, 8, 9 and 10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably.

Additionally or alternatively, the example processes of FIGS. 7, 8, 9, and 10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

The program 700 of FIG. 7 begins at block 702 at which the example image capture scheduler 202 (see FIG. 2) of the example remote monitor 102 (see FIG. 1 and FIG. 2) causes the example image sensor 110 (see FIG. 1) to capture images of an example field of interest in which objects to be monitored ("monitored objects") reside. The image capture scheduler 202 determines and analyzes a rate of change in the field of interest and, if needed, adjusts an image capture rate at which images are captured by the image sensor 110 (see block 704). In some examples, the example image analyzer 204 (see FIG. 2) analyzes and processes image information supplied by the image capture scheduler 202. In some examples, the processing may include reducing the amount of data used to represent the image, dividing the image into frames and estimating the amount of information included in the frames (see block 706). The example frame packager 206 (see FIG. 2) packages the frames for transmission to the base station 104 (see FIG. 1) (see block 708). In some examples, packaging the frames includes identifying high priority frames, reducing the data included in the high priority frames, generating an order of frame transmission, appending additional information, etc. The example first wireless radio transceiver 106 (see FIG. 1) subsequently transmits the frames to the example second wireless radio transceiver 108 of the example base station 104 (see block 710). The base station 104 operates to arrange the received frames in an order suitable for analysis and proceeds to analyze the arranged frames (see block 712). The base station controller additionally actuates, if needed, additional equipment in response to the frame analysis (see block 714). Thereafter the program returns to the block 702.

The program 700 of FIG. 7 provides example operations performed by the example remote monitor 102 (see FIG. 1 and FIG. 2) whereas the program 800 of FIG. 8 provides example operations performed by the example image controller 202 (see FIG. 2). The program 800 of FIG. 8 begins at block 802 at which an initial image capture schedule is installed in the example image capture scheduler 202 (see FIG. 2) of the example remote monitor 102 (see FIG. 1 and FIG. 2). In some examples, the image capture schedule is set by a field operator using the keypad/touchscreen 230 (see FIG. 2) disposed on the remote monitor 102. In some examples, the image capture schedule is installed prior to installation of the remote monitor in the field. In some examples, the image capture schedule is supplied to the remote monitor 102 from the base station 104 via wireless communication. The image capture scheduler 202 captures a first image at a first time and a second image at a second time wherein the first times and the second times and/or the amount of time between the first and second times are selected in accordance with the image capture schedule (see block 804). The example image difference generator 208 creates a difference image using the first and second image (see block 806). The difference image represents the changes that occurred in the field of interest in the time intervening between the first time and the second time. The example comparator 210 determines an amount of information (e.g., a byte size) used to represent the difference image and compares the amount of information to one or more threshold image data values stored in the data storage 214 (see FIG. 1) (see block 808). As described with respect to FIG. 2, depending on the results of the comparison, the image capture scheduler 212 adjusts (if needed) the rate at which the image sensor 110 subsequently captures image (see block 810). The image capture controller 202 subsequently supplies the difference image to the image analyzer 204 or otherwise notifies the image analyzer that the difference image is available in the image storage 114 for processing/analysis (see block 812). Thereafter, the method returns to the block 804 at which a next set of images (e.g., a third and a fourth image are captured).

The program 900 of FIG. 9 provides example operations performed by the example image analyzer 204 (see FIG. 2) of the remote monitor 102 (see FIG. 1 and FIG. 2). The program 900 of FIG. 9 begins at block 902 at which the example edge detector 216 (see FIG. 2) of the example image analyzer 204 performs edge detection on the difference image generated by the image capture controller 202 (see block 902). The edge detector uses edge detection to identify the edges (e.g., outlines) of the monitored objects included in the difference image. The regions of the difference image that are interior to the outlines are populated with pixels having a first color (e.g., black pixels) and the regions of the difference image that are exterior to the outline are populated with pixels of a different color (e.g., white). Performing edge detection in this manner reduces the size of the difference image. The example image divider 218 (see FIG. 2) divides the image into a set of frames (see block 904). Each of the frames is assigned a number indicating an order in which the frames are to be assembled to form the difference image. The example information estimator 220 (see FIG. 2) estimates an amount of meaningful information included in each of the frames (see block 906). In some examples, the amount of meaningful information included in each frame is estimated by determining the number of black pixels to the number of white pixels. The information estimator 220 supplies the frames and estimated information values corresponding to each to the frame packager 206 (see block 908). The method 900 of FIG. 9 returns to block 902 to process/analyze a next difference image.

Figure 10:
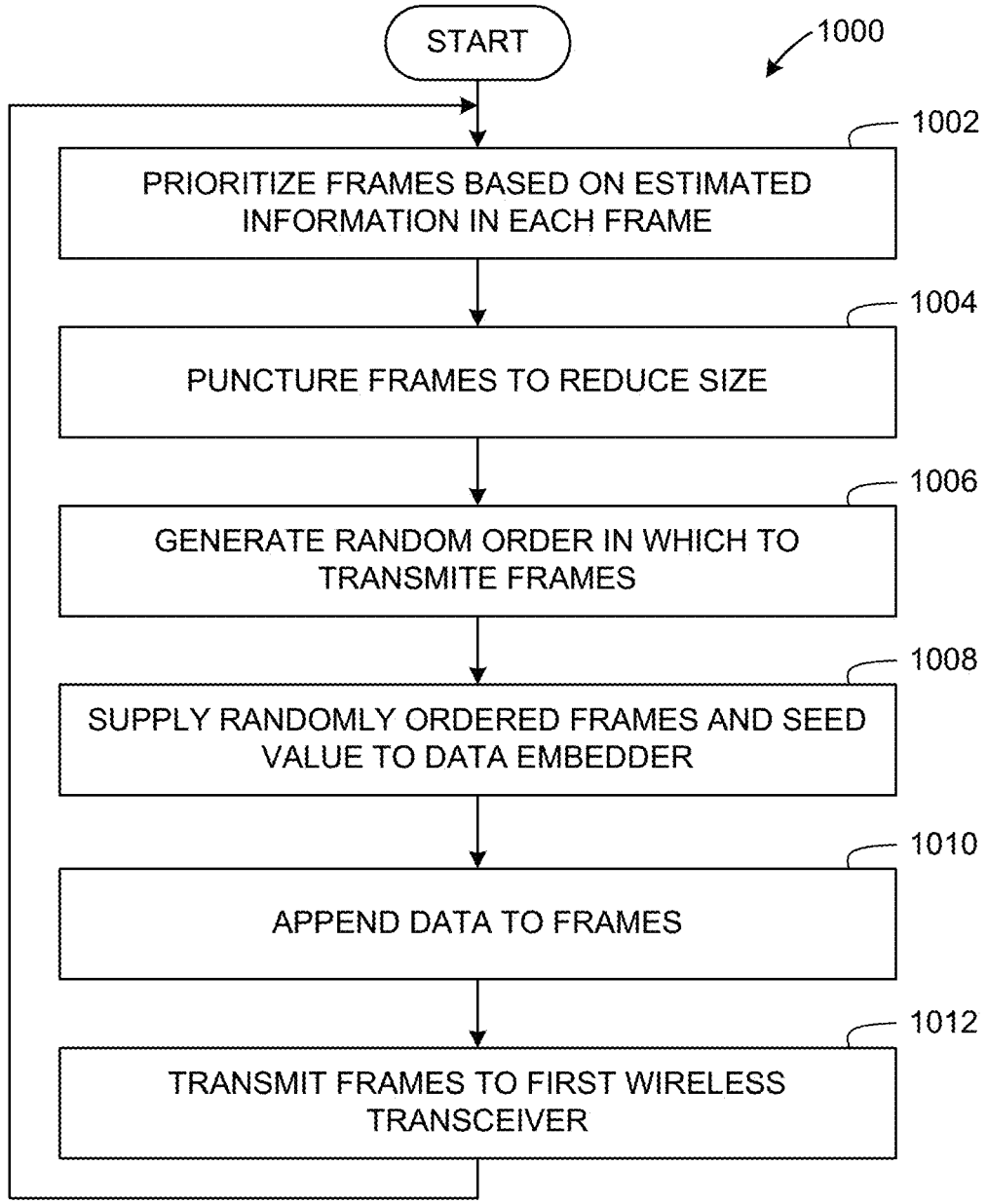
FIG. 10 is a flowchart representative of example machine readable instructions which may be executed to implement the example frame packager of FIG. 2.

The program 1000 of FIG. 10 provides example operations performed by the example frame packager 206 (see FIG. 2) of the remote monitor 102 (see FIG. 1 and FIG. 2). The program 1000 of FIG. 10 begins at block 1002 at which the example frame prioritizer 222 (see FIG. 2) of the example frame packager 206 uses the estimated information values corresponding to each frame supplied by the example image analyzer 204 to determine a priority of the frames. In some examples, the frames having the highest estimated amount of information are given a higher priority than other frames. In some examples, the higher priority frames are to be transmitted to the base station 104, as described below, and the lower priority frames are not transmitted to the base station 104. The example puncturing tool 224 punctures pixels of the priority images (as supplied by the frame prioritizer 222) by removing a select number of the pixels from the priority images (block 1004). The removed pixels do not negatively impact the amount of meaningful information conveyed by the priority images. In some examples the puncturing tool 224 removes pixels in a defined pattern (e.g., every other white pixels is removed thereby creating a checkerboard effect, every other black pixel is removed, etc.). The example frame order generator 226 uses a random number generating technique to determine a random order in which the punctured priority frames are to be transmitted to the base station 104 (block 1006). In some examples, the random number generation technique used by the frame order generator 226 is based on a seed value that can be used at the base station 104 to reorder the punctured priority frames in the order/sequence to reform the difference image. In some such examples, the frame order generator 226 supplies the punctured frames in the randomly generated order along with the corresponding seed value to the example data embedder 228 (see block 1008). The example data embedder 228 adds information to frame header to be transmitted with the frames. In some examples, the information in the frame header includes the seed value, a total number of frames being transmitted, and data identifying an amount of charge remaining in an example battery 120 (see FIG. 2). In some such examples, the data embedder 228 obtains the amount of battery charge from the example battery monitor 122 (see FIG. 2) that monitors the example battery 120 (see block 1010). Any other information (e.g., frame/image pixel counts, start of image markers, etc.) may additionally be included in the header. The frames and frame header(s) are then supplied to the first wireless radio transceiver 106 which transmits the frames and frame headers to the base station 104 (see block 1012). Thereafter, the method returns to the block 1002 at which a next set of frames associated with a next difference image are prioritized.

Figure 11:
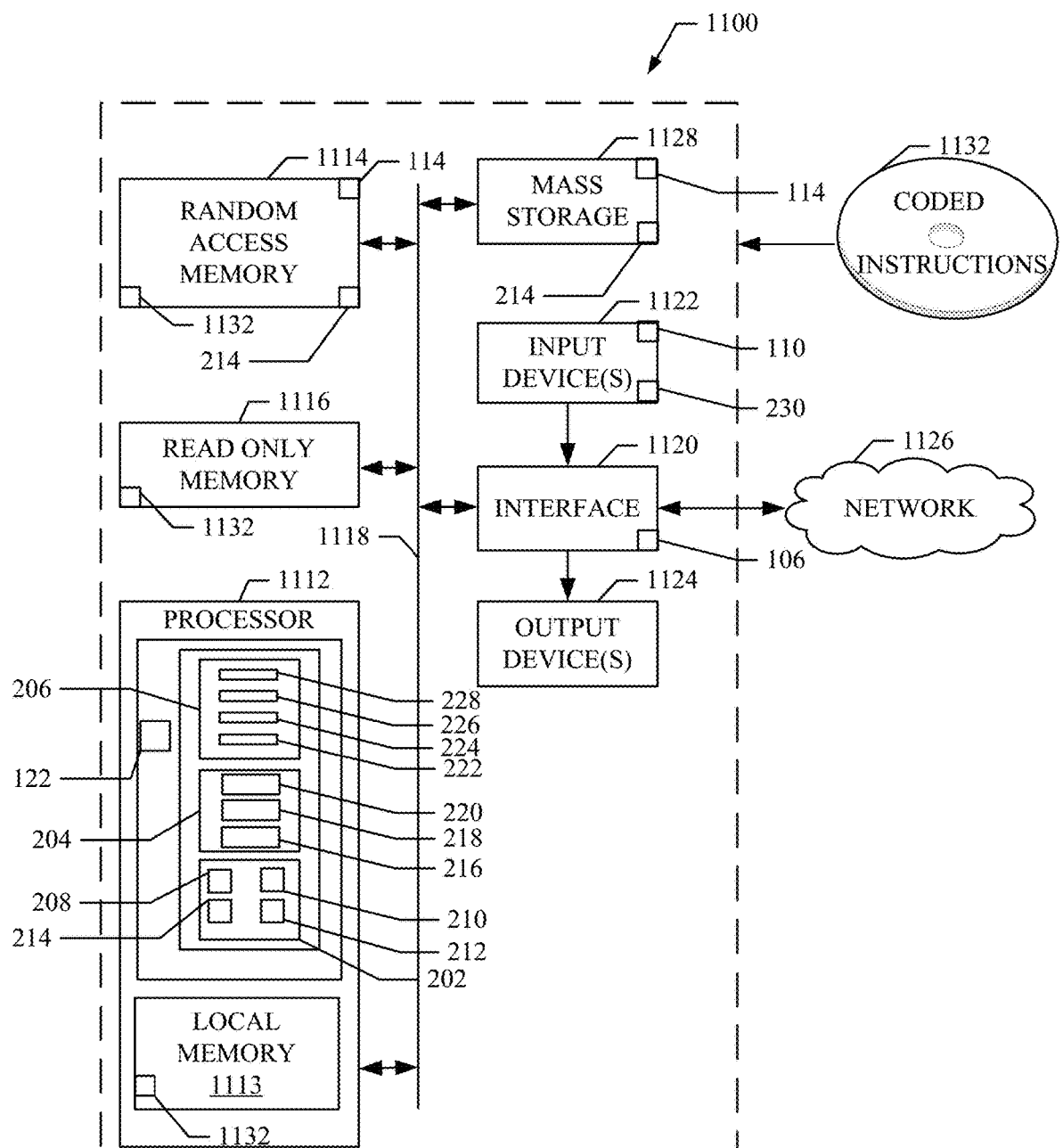
FIG. 11 is a block diagram of an example processor platform capable of executing the instructions of FIGS. 7, 8, 9 and 10 to implement the example remote monitor of FIGS. 1 and 2.

FIG. 11 is a block diagram of an example processor platform 1100 capable of executing the instructions of FIGS. 7, 8, 9 and 10 to implement the remote monitor 102 of FIG. 1 and FIG. 2. The processor platform 1100 can be, for example, a server, a personal computer, a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a microcontroller unit or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer. In some examples, the processor 1112 includes the example remote monitor controller 112, the example image capture controller 202, the example image analyzer 204, the example frame packager 206, the example image difference generator 208, the example comparator 210, the example image capture scheduler 212, the example data storage 214, the example edge detector 216, the example image divider 218, the example information estimator 220, the example frame prioritizer 222, the example image puncturing tool 224, the example frame order generator 226, the example data embedder 228, and the example battery monitor 122.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller. In some examples, the volatile memory 1114 is used to implement the example image storage 114 and/or the example data storage 214. In some examples, the non-volatile memory 1116 is used to implement the data storage 214.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 can be implemented with the example keyboard/touch pad 230 and permit(s) a user to enter data and commands into the processor 1112. In some examples, the input device(s) can be implemented by, for example, an audio sensor, a microphone, an image sensor (still or video) such as the example image sensor 110, a keyboard (such as the keypad 230), a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, a low power wireless area network, etc.). In some examples, the example first wireless transceiver 106 is implemented using the interface circuit 1120.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives. In some examples, the example image storage 114 and the example data storage 214 are implemented using the mass storage devices 1128.

The coded instructions 1132 of FIGS. 6, 7 and 8 may be stored in the mass storage device 1128, in the volatile memory 1114, in the non-volatile memory 1116, and/or on a removable tangible computer readable storage medium such as a CD or DVD.

From the foregoing, it will appreciated that the above disclosed methods, apparatus and articles of manufacture permit monitoring of remote fields of interest in a low-power manner using lossy volatile communication networks. The example remote monitoring methods, systems, apparatus and articles of manufacture disclosed herein are configured to capture and process monitoring data for transmission via lossy, volatile networks including low power wide area networks. Such example remote monitoring systems are configured to adjust a rate at which monitoring data in the form of images are collected based on an amount of activity occurring in a field of interest. In some examples, an increase in the amount of activity in the field of interest cause an increase in a rate at which images are captured. Likewise, a reduction in the amount of activity occurring in the field of interests causes a reduction in the rate at which images of the field of interest are captured. In this manner, the energy used by the example monitors to capture, process and transmit information (e.g., the images) is conserved while preserving the ability to capture and transmit meaningful data. In addition, the disclosed remote monitoring technologies are configured to reduce the size of the transmitted image data sets while still conveying an amount of data sufficient to inform system personnel about the status of monitored objects. Image/data size reduction techniques include the creation of difference images that focus on differences occurring between two images taken at different times thereby negating the need to send both images to a base station. Additionally, only portions of image (e.g., frames) that illustrate changes in the field of interest are prioritized for transmission to the base station. Still further, image puncturing techniques are used to remove image pixels in a manner that minimizes impact on the meaning conveyed by the image. Additionally, the frames are transmitted in a random order to lessen impact of a loss of consecutively transmitted frames. The state of charge and other data is appended to the frames prior to transmission to the base station thereby reducing the manpower needed to periodically check the status of batteries installed in the remote monitors.

An example method for processing image data disclosed herein adjusting an image capture rate at which an image sensor captures images based on a difference image. The difference image contains differences between a first image of a first set of objects and a second image of a second set of objects. Example methods further includes reducing a file size of the difference image using an edge detection technique, and prioritizing one or more of a set of frames based on an amount of information contained in the frames. The frames are subdivisions of the image. In some examples methods, the first image is taken at a first time and the second image is taken at a second, later time and the method further includes subtracting the first image from the second image to generate the difference image. In further example methods, adjusting the image capture rate includes determining the file size of the difference image, and generating a comparison between the file size to a threshold value. In some such example methods, the adjusting of the image capture rate depends on the comparison. In still further example methods, reducing the file size of the difference image includes using the edge detection technique to determine a set of outlines of a corresponding set of objects appearing in the difference image, causing a first set of pixels located within the outlines to be a first color, and causing a second set of pixels located outside of the outlines to a second color. In some example methods, prioritizing one or more of the set of frames includes dividing the difference image into the set of frames, estimating an amount of information included in each frame of the set of frames, and assigning a priority to each frame of the set of frames based on the amount of estimated information included each frame of the set of frames.

Some example methods further include selecting at least one of the frames of the set of frames to be transmitted to a base station based on the prioritizing, arranging the at least one of the frames to be transmitted in a randomly generated order based on a seed value and appending information to the at least one of the frames to be transmitted. The information can include a state of charge of a battery, a number of frames to be transmitted, and the seed value.

An example apparatus disclosed herein includes means to perform any of the methods disclosed above. Examples disclosed herein further include a machine readable storage medium storing machine readable instructions which, when executed, cause the machine to implement any of the methods disclosed herein.

Example apparatus disclosed herein further include means to adjust an image capture rate at which an image sensor captures images based on a difference image. The difference image contains differences between a first image of a first set of objects and a second image of a second set of objects. Additional example apparatus include means to reduce a file size of the difference image using an edge detection technique, means to prioritize one or more of a set of frames based on an amount of information contained in the frames, the frames being subdivisions of the image and means to select at least one of the frames of the set of frames to be transmitted to a base station based on the prioritizing.

Further example apparatus include means to arrange the at least one of the frames to be transmitted in a randomly generated order based on a seed value, and means to append information to the at least one of the frames to be transmitted. The information can include a state of charge of a battery, a number of frames to be transmitted, and the seed value.

Some example apparatus take the first image at a first time and the second image at a second, later time, and subtract the first image from the second image to generate the difference image. Further example apparatus reduce the file size of the difference image by using the edge detection technique to determine a set of outlines of a corresponding set of objects appearing in the difference image, causing a first set of pixels located within the outlines to be a first color, and causing a second set of pixels located outside of the outlines to a second color. Some example apparatus prioritize one or more of the set of frames by dividing the difference image into the set of frames, estimating an amount of information included in each frame of the set of frames, and assigning a priority to each frame of the set of frames based on the amount of estimated information included each frame of the set of frames.

Example remote monitors for monitoring a field of interest disclosed herein include an image capture controller to cause an image sensor to capture images of the field of interest at a rate that varies based on an amount of activity occurring in the field of interest. Some such example remote monitors also include an image analyzer to reduce an amount of data used to represent an image of a set of objects appearing in the field of interest between a first time and a second time. The image analyzer further reduces an amount of data used to represent an image of a set of objects appearing in the field of interest by dividing the image into a set of frames. Example remote monitors also estimate an amount of information associated with each frame and use a frame packager to prioritize a subset of the frames. The prioritized subset of frames are packaged with data to transmitted to a transceiver.

In some example remote monitors, the image capture controller includes a difference generator to create a difference image identifying differences between a first image taken at the first time and a second image taken at the second time. Such example image capture controllers also include a comparator to generate a comparison between a file size of the difference image an threshold data value and an image capture scheduler to adjust the rate at which images are captured by the image sensor based on the comparison. The image capture scheduler can increase the rate at which images are captured if the comparison indicates that the file size of the difference image is equal to or exceeds the threshold data value.

The example image analyzer of the example remote monitors disclosed herein can include an edge detector to differentiate the set of objects appearing in the image from a background of the image and an image divider to divide the image into the set of frames. Additionally, an information estimator estimates the amount of information associated with each frame. The amount of information associated with each frame can be based on a first number of pixels representing the objects in each frame and a second number of pixels representing the background in the each frame. In some example remote monitors, the frame packager includes a prioritizer to identify at least some of the subset of frames as being priority frames based on the estimated amount of information associated with each of the subset of frames. An example puncturing tool removes pixels from the priority frames and an order generator generates an order in which the priority frames are to be transmitted to a remote base station. In yet further examples, a data embedder appends data to the priority frames before transmission of the priority frames to the remote base station. In some examples, the order generator uses a seed value to generate the order and the data embedder appends the seed value to the priority frames. In still further examples, the remote monitor includes a battery to power the remote monitor and a battery monitor to determine a state of charge of the battery. The state of the charge of the battery is to be transmitted to the transceiver.

Example tangible machine readable storage medium including instructions are also disclosed herein. Some such example instructions, when executed, cause a machine to, based on the rate of change of an amount of activity occurring within a field of interest, adjust an image capture rate at which an image sensor captures images of the field of interest. In addition, the instructions cause the machine to reduce a file size of a difference image illustrating changes occurring in the field of interest between a first time and a second time and prioritize each of a set of frames based on a quality of information contained in each frame. The set of frames together form the image. Instructions additionally cause the machine to package at least some of the frames for transmission to a remote transceiver based on a priority assigned to each frame.

Example instructions further cause the machine to determine the rate of change of the amount of activity occurring within the field of interest by generating the difference image. The difference image is generated by subtracting a first image taken at the first time from a second image taken at the second time. In some examples, the instructions cause the machine to increase the image capture rate when the amount of activity in the field of interest between the first time and the second time exceeds a threshold. In some examples, the instructions cause the machine to reduce the file size of the difference image by removing a first set of details from the difference image while retaining a second set of details in the difference image. Further example instructions cause the machine to determine the quality of information contained in each frame by comparing a first number of pixels representing an object appearing in the frame to a second number of pixels representing a background appearing in the frame.

Some example instructions cause the machine to package the frames selected for transmission to the remote transceiver by reducing the size of the frames selected for transmission by removing selected pixels from the frames selected for transmission, arranging the frames selected for transmission in a random order, and appending information to the frames selected for transmission. Further instructions cause the machine to determine a state of charge of a battery, and append information identifying the state of charge to the frames selected for transmission.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to perform remote monitoring, the apparatus comprising:
memory; and
at least one processor to execute computer readable instructions to:
divide an image into a plurality of frames, respective ones of the plurality of frames associated with (i) corresponding interior pixels that lie within one or more object outlines and (ii) corresponding exterior pixels that lie outside the one or more object outlines;
identify a set of priority frames from the plurality of frames based on corresponding amounts of interior pixels associated with the respective ones of the plurality of frames;
generate an order in which the set of priority frames is to be transmitted to a remote base station, the order to be generated based on a random number generator and a seed value; and
embed the seed value and a size of the set of priority frames in at least one of the set of priority frames prior to transmission of the set of priority frames to the remote base station based on the order, the size of the set of priority frames corresponding to a total number of priority frames included in the set of priority frames.

2. The apparatus of claim 1, wherein the amounts are represented as percentages.

3. The apparatus of claim 1, wherein the image is a monochromatic image, the corresponding interior pixels associated with the respective ones of the plurality of frames have a first color, and the corresponding exterior pixels associated with the respective ones of the plurality of frames have a second color.

4. The apparatus of claim 3, wherein the at least one processor is to perform edge detection on the monochromatic image to identify the one or more object outlines.

5. The apparatus of claim 1, wherein to embed the seed value and the size of the set of priority frames in the at least one of the set of priority frames, the at least one processor is to include the seed value and the size of the set of priority frames in a frame header of the at least one of the set of priority frames.

6. The apparatus of claim 5, wherein the at least one processor is to include battery charge information in the frame header of the at least one of the set of priority frames, the battery charge information representative of a charge state of a battery of the apparatus.

7. At least one non-transitory computer readable medium comprising computer readable instructions that, when executed, cause at least one processor to at least:
divide an image into a plurality of frames, respective ones of the plurality of frames associated with (i) corresponding interior pixels that lie within one or more object outlines and (ii) corresponding exterior pixels that lie outside the one or more object outlines;
identify a set of priority frames from the plurality of frames based on corresponding amounts of interior pixels associated with the respective ones of the plurality of frames;
generate an order in which the set of priority frames is to be transmitted to a remote base station, the order to be generated based on a random number generator and a seed value; and
embed the seed value and a size of the set of priority frames in at least one of the set of priority frames prior to transmission of the set of priority frames to the remote base station based on the order, the size of the set of priority frames corresponding to a total number of priority frames included in the set of priority frames.

8. The at least one non-transitory computer readable medium of claim 7, wherein the amounts are represented as percentages.

9. The at least one non-transitory computer readable medium of claim 7, wherein the image is a monochromatic image, the corresponding interior pixels associated with the respective ones of the plurality of frames have a first color, and the corresponding exterior pixels associated with the respective ones of the plurality of frames have a second color.

10. The at least one non-transitory computer readable medium of claim 9, wherein the instructions cause the at least one processor to perform edge detection on the monochromatic image to identify the one or more object outlines.

11. The at least one non-transitory computer readable medium of claim 7, wherein to embed the seed value and the size of the set of priority frames in the at least one of the set of priority frames, the instructions cause the at least one processor to include the seed value and the size of the set of priority frames in a frame header of the at least one of the set of priority frames.

12. The at least one non-transitory computer readable medium of claim 11, wherein the instructions cause the least one processor to include battery charge information in the frame header of the at least one of the set of priority frames, the battery charge information representative of a charge state of a battery.

13. A method comprising:
dividing an image into a plurality of frames, respective ones of the plurality of frames associated with (i) corresponding interior pixels that lie within one or more object outlines and (ii) corresponding exterior pixels that lie outside the one or more object outlines;
identifying a set of priority frames from the plurality of frames based on corresponding amounts of interior pixels associated with the respective ones of the plurality of frames;
generating, by executing an instructions with at least one processor, an order in which the set of priority frames is to be transmitted to a remote base station, the order to be generated based on a random number generator and a seed value; and
embedding, by executing an instructions with the at least one processor, the seed value and a size of the set of priority frames in at least one of the set of priority frames prior to transmission of the set of priority frames to the remote base station based on the order, the size of the set of priority frames corresponding to a total number of priority frames included in the set of priority frames.

14. The method of claim 13, wherein the image is a monochromatic image, the corresponding interior pixels associated with the respective ones of the plurality of frames have a first color, and the corresponding exterior pixels associated with the respective ones of the plurality of frames have a second color.

15. The method of claim 14, further including performing edge detection on the monochromatic image to identify the one or more object outlines.

16. The method of claim 13, wherein the embedding includes adding the seed value and the size of the set of priority frames to a frame header of the at least one of the set of priority frames.

17. The method of claim 16, further including adding battery charge information in the frame header of the at least one of the set of priority frames, the battery charge information representative of a charge state of a battery.

18. The method of claim 13, wherein the amounts are represented as percentages.

* * * * *